United States Patent Office 3,769,356
Patented Oct. 30, 1973

3,769,356
PREPARATION OF NITROCYCLOPROPANE FROM NITROMETHANE AND VINYL BROMIDE
John D. Bacha and Charles M. Selwitz, Borough of Monroeville, Pa., assignors to Gulf Research & Development Company, Pittsburgh, Pa.
No Drawing. Filed Feb. 5, 1973, Ser. No. 329,567
Int. Cl. C07c 79/08
U.S. Cl. 260—644
8 Claims

ABSTRACT OF THE DISCLOSURE

Nitrocyclopropane is prepared by reacting nitromethane and vinyl bromide in the presence of a base and a polar, aprotic solvent. Nitromethane and vinyl bromide react in dimethyl sulfoxide in the presence of potassium carbonate with the production of nitrocyclopropane.

---

This invention relates to a method of making nitrocyclopropane. More particularly, this invention relates to a method of making nitrocyclopropane by the reaction of nitromethane and vinyl bromide in the presence of a base and a polar, aprotic solvent.

Nitrocyclopropane has been made in low yield by the direct nitration of cyclopropane. Nitrocyclopropane has also been made by the ring closure of 3-iodo-1-nitropropane in a multistep process. We have discovered a method of making nitrocyclopropane in a single step from readily available, moderately priced reactants, namely, nitromethane and vinyl bromide. Our invention is, in part, based on the discovery that this ring-forming reaction takes place at moderate conditions in the presence of a base and a polar, aprotic solvent.

Useful polar, aprotic solvents include the sulfoxides, the sulfones, the di-N-substituted carboxylic acid amides, the N-substituted pyrrolidones, and the like. The sulfoxides are defined by the formula $R_1(R_2)S:O$ in which $R_1$ and $R_2$ are independently selected from lower alkyl, phenyl and benzyl, and chlorine substituted derivatives thereof. Dimethyl sulfoxide is the preferred sulfoxide. Also useful are diethyl sulfoxide, di-n-propyl sulfoxide, di-n-butyl sulfoxide, di-2-chloroethyl sulfoxide, diphenyl sulfoxide, methyl phenyl sulfoxide, benzyl phenyl sulfoxide, dibenzyl sulfoxide, and the like. The sulfones are defined by the formula $R_3(R_4)SO_2$ in which $R_3$ and $R_4$ are independently selected from lower alkyl and can be joined together to form a cyclic compound having from three to eight members in the ring. Sulfolane also known as tetramethylene sulfone is the preferred sulfone. Also useful are dimethyl sulfone, diethyl sulfone, trimethylene sulfone, pentamethylene sulfone, hexamethylene sulfone, and the like.

The di-N-substituted carboxylic acid amides are defined by the formula $R_5CONR_6(R_7)$ in which $R_5$ is hydrogen or lower alkyl and $R_6$ and $R_7$ are independently lower alkyl. Preferred di-N-substituted carboxylic acid amides are dimethyl formamide and dimethyl acetamide. Also useful are diethyl formamide, diethyl acetamide, di-n-propyl acetamide, di-t-butyl acetamide, dimethyl butyramide, dimethyl propionamide, and the like. The useful N-substituted pyrrolidones include the N-lower alkyl alpha and beta pyrrolidones. Preferred are N-methyl pyrrolidone and n-ethyl pyrrolidone and N-ethyl pyrrolidone. Other polar, aprotic solvents are useful herein such as hexamethylenephosphoramide and the like. As used herein, lower alkyl includes alkyl groups having from one to about four carbon atoms. Suitable mixtures of two or more polar, aprotic solvents can also be used.

Any alkali metal or magnesium carbonate, bicarbonate, hydroxide, lower alkoxide, fluoride, or lower alkyl carboxylate; or calcium, barium or strontium oxide or hydroxide; or ammonium carbonate, hydroxide, fluoride or lower alkyl carboxylate; or a mixture thereof can be used as the base in this system. We prefer potassium carbonate and sodium carbonate. Although the specified fluorides are not generally considered to be bases, they possess useful basic properties when dissolved in the polar, aprotic solvent and are therefore defined as bases herein. Although we mean to include lithium, sodium, potassium, rubidium and cesium as alkali metals herein, we prefer the first three members of the group and particularly potassium and sodium due to availability and moderate cost. The alkoxides have from one to about four carbon atoms and include the methoxide, ethoxide, propoxide, t-butoxide, and the like. The lower alkyl carboxylates have up to about four carbon atoms and include acetate, propionate, isobutyrate, and the like.

Also useful as the base for reaction in this process is a primary, secondary or tertiary alkyl or cycloalkyl amine in which each alkyl group independently has from one to about eight carbon atoms and each cycloalkyl group contains from five to six carbon atoms. Useful amines include monoethylamine, dimethylamine, trimethylamine, triethylamine, isopropylamine, n-butylamine, cyclohexylamine, n-octylamine, and the like.

The reaction of the nitromethane and the vinylbromide is a liquid phase reaction carried out in the polar, aprotic solvent with the reactants dissolved in the solvent. This requires that the base and the solvent be suitably selected to insure that the base which is used is sufficiently soluble in the desired polar, aprotic solvent to effect reaction at a suitable rate. The base is also involved as a reactant in this system.

The temperature for carrying out the reaction is not critical. At too low a temperature the reaction occurs at an impractical rate, while at too high a temperature undesired decomposition becomes important. Since the reaction rate increases as the temperature increases, an elevated temperature can in many instances be advantageously employed. Also, an elevated temperature may be preferred with certain combinations of base and polar, aprotic solvent to increase the solubility of the base in the solvent. In view of this, a broad temperature range of about 15° to about 160° C. is useful.

The reaction can be carried out at atmospheric pressure by bubbling the vinyl bromide into a solution of the nitromethane and the base in the polar, aprotic solvent. It is also a desirable procedure to carry out the reaction at an elevated pressure such as by charging the reactants and polar, aprotic solvent to a closed reactor in a batch-type reaction. The reaction can also be carried out as a continuous reaction by introducing the base, the nitromethane, the vinyl bromide and the polar, aprotic solvent into an elongated reactor in which the reaction temperature is maintained as the reaction mixture progresses to the outlet. In this continuous procedure the pressure in the reactor is controlled by the temperature and the relative rates at which the reactant mixture is fed to the reactor and the product mixture is metered out of the reactor. Because of apparatus and equipment costs, a maximum pressure lower than about 500 p.s.i. (about 35 kg. per sq. cm.) is preferred, although higher pressures can be used if desired.

The relative proportions of the nitromethane, the vinyl bromide, the base and the polar, aprotic solvent that are used are not critical to obtaining reaction. However, it is desirable to maintain the relative amounts within limits for greater efficiency. When the vinyl bromide is bubbled through the reaction liquid, it is used in great excess overall in order to introduce a sufficient amount of dissolved vinyl bromide in the reaction liquid for reaction with the nitromethane. For this reason, the following proportions, to the extent that they refer to vinyl bromide, only relate to processes such as the batch or continuous process in which the vinyl bromide is charged to the reactor and is available for reaction. With this in consideration, the molar ratio of vinyl bromide to nitromethane can suitably be between about 1:1 and about 10:1. The molar ratio of vinyl bromide to the base can suitably be between about 0.25:1 and about 5:1. The ratio of the polar, aprotic solvent in liters to the base in mols can suitably be between about 0.5:1 and about 10:1. And the ratio of the polar, aprotic solvent in liters to the vinyl bromide in mols can suitably be between 0.1:1 and about 40:1.

In a demonstration of this reaction 200 ml. of dimethyl sulfoxide was placed in a one liter reaction flask. Powdered potassium carbonate (0.16 mol) was dissolved in the dimethyl sulfoxide as it was stirred. Nitromethane (0.08 mol) was added to the reactor and the temperature was maintained at 28° C. as vinyl bromide was bubbled through the reaction liquid. After two hours, the temperature was raised to 48° C. as the introduction of the vinyl bromide continued. After the end of four hours, the flow of vinyl bromide was stopped at which time a total of 1.2 mols of vinyl bromide had been bubbled through the reaction liquid. Analysis of the reaction product by gas liquid chromatography disclosed a yield of nitrocyclopropane of greater than 25 percent based on the nitromethane consumed at a conversion of about 8.3 percent.

Nitrocyclopropane is produced in like manner when vinyl bromide and nitromethane are reacted in the presence of sodium methoxide and sulfolane, when vinyl bromide and nitromethane are reacted in the presence of magnesium bicarbonate and dimethylformamide, when vinyl bromide and nitromethane are reacted in the presence of ammonium acetate and N-methyl pyrrolidone, when vinyl bromide and nitromethane are reacted in the presence of trimethylamine and hexamethylenephosphoramide, when vinyl bromide and nitromethane are reacted in the presence of potassium fluoride and dimethyl acetamide, when vinyl bromide and nitromethane are reacted in the presence of sodium methoxide and diethyl sulfoxide, when vinyl bromide and nitromethane are reacted in the presence of calcium hydroxide and dimethyl sulfoxide, and the like.

It is to be understood that the above disclosure is by way of specific example and that numerous modifications and variations are available to those of ordinary skill in the art without departing from the true spirit and scope of our invention.

We claim:

1. A method for preparing nitrocyclopropane which comprises reacting nitromethane and vinyl bromide in the presence of a base selected from alkali metal or magnesium carbonate, bicarbonate, hydroxide, lower alkoxide, fluoride or lower alkyl carboxylate; or calcium, barium or strontium oxide or hydroxide; or ammonium carbonate, hydroxide, fluoride or lower alkyl carboxylate; or primary, secondary or tertiary alkyl or cycloalkyl amine in which each alkyl group has from one to about eight carbon atoms and each cycloalkyl group contains from five to six carbon atoms in a polar, aprotic solvent at a temperature between about 15° and about 160° C.

2. A method in accordance with claim 1 in which the polar, aprotic solvent is a sulfoxide defined by the formula $R_1(R_2)S:O$ in which $R_1$ and $R_2$ are independently selected from lower alkyl, phenyl or benzyl or chlorine substituted derivative thereof; a sulfone defined by the formula $R_3(R_4)SO_2$ in which $R_3$ and $R_4$ are independently selected from lower alkyl and can be joined together in a cyclic compound having from three to eight members in the ring; a di-N-substituted carboxylic acid amide defined by the formula $R_5CONR_6(R_7)$ in which $R_5$ is hydrogen or lower alkyl and $R_6$ and $R_7$ are independently lower alkyl; an N-lower alkyl alpha or beta pyrrolidone; hexamethylenephosphoramide; or a mixture thereof.

3. A method for preparing nitrocyclopropane in accordance with claim 1 in which the polar, aprotic solvent is dimethyl sulfoxide.

4. A method in accordance with claim 1 in which the molar ratio of vinyl bromide to nitromethane is between about 1:1 and about 10:1.

5. A method in accordance with claim 1 in which the molar ratio of vinyl bromide to the base is between about 0.25:1 and about 5:1.

6. A method in accordance with claim 1 in which the ratio of the polar, aprotic solvent in liters to the base in mols is between about 0.5:1 and about 10:1.

7. A method in accordance with claim 1 in which the ratio of the polar, aprotic solvent in liters to the vinyl bromide in mols is between about 0.1:1 and about 40:1.

8. A method for preparing nitrocyclopropane which comprises reacting nitromethane and vinyl bromide in the presence of sodium carbonate or potassium carbonate in dimethyl sulfoxide at a temperature between about 15° and about 160° C.

References Cited
UNITED STATES PATENTS

| | | | |
|---|---|---|---|
| 3,100,805 | 8/1963 | Bay | 260—644 |
| 3,100,806 | 8/1963 | Bay | 260—644 |

OTHER REFERENCES

Rodd's Chemistry of Carbon Compounds, S. Coffey, editor, 2nd ed., vol. II, part A, Elsevier Pub. Co., London, 1964, p. 45.

LELAND A. SEBASTIAN, Primary Examiner